Figure 1:
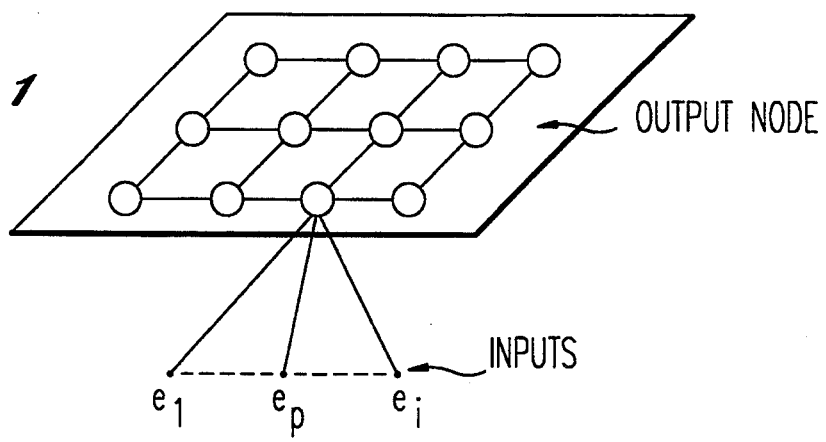

United States Patent [19]

Burel et al.

[11] Patent Number: 5,369,503
[45] Date of Patent: Nov. 29, 1994

[54] METHOD OF PICTURE COMPRESSION BY AUTO-ORGANISATION OF A NEURAL NETWORK

[75] Inventors: Gilles Burel; Isabelle Pottier, both of Rennes, France

[73] Assignee: Thomson-CSF, Puteaux, France

[21] Appl. No.: 730,871

[22] PCT Filed: Dec. 6, 1990

[86] PCT No.: PCT/FR90/00888

§ 371 Date: Jul. 25, 1991

§ 102(e) Date: Jul. 25, 1991

[87] PCT Pub. No.: WO91/08546

PCT Pub. Date: Jun. 13, 1991

[30] Foreign Application Priority Data

Dec. 6, 1989 [FR] France ................... 8916111

[51] Int. Cl.⁵ .............................................. H04N 1/40
[52] U.S. Cl. ..................... 358/433; 358/430
[58] Field of Search ............... 358/261.1, 261.4, 426, 358/430, 433

[56] References Cited

U.S. PATENT DOCUMENTS 5,041,916  8/1991  Yoshida et al. ................... 358/433

Primary Examiner—Stephen Brinich
Attorney, Agent, or Firm—Oblon, Spivak, McClelland, Maier & Neustadt

[57] ABSTRACT

The method of picture compression consists:
  in processing a current displaced pixel block in the picture to be compressed by using a network of N neurons, 1 to N, disposed in a single plane, each neuron having a number of inputs equal to the dimension of the blocks extracted from the picture, and such that, after a learning phase during which the network has auto-organised so that the neurons represent most probable input values, each neuron receives on its inputs, at the same instant, the pixels of the current block and outputs a signal, or potential, $d_j$, which is positive and is all the lower the nearer is the state of the corresponding neuron j to the state of the inputs $e_i$,
  in coding the current pixel block through a code associated with the neuron j whose potential $d_j$ is minimal.

The invention applies, in particular, to the compression of television pictures.

5 Claims, 4 Drawing Sheets

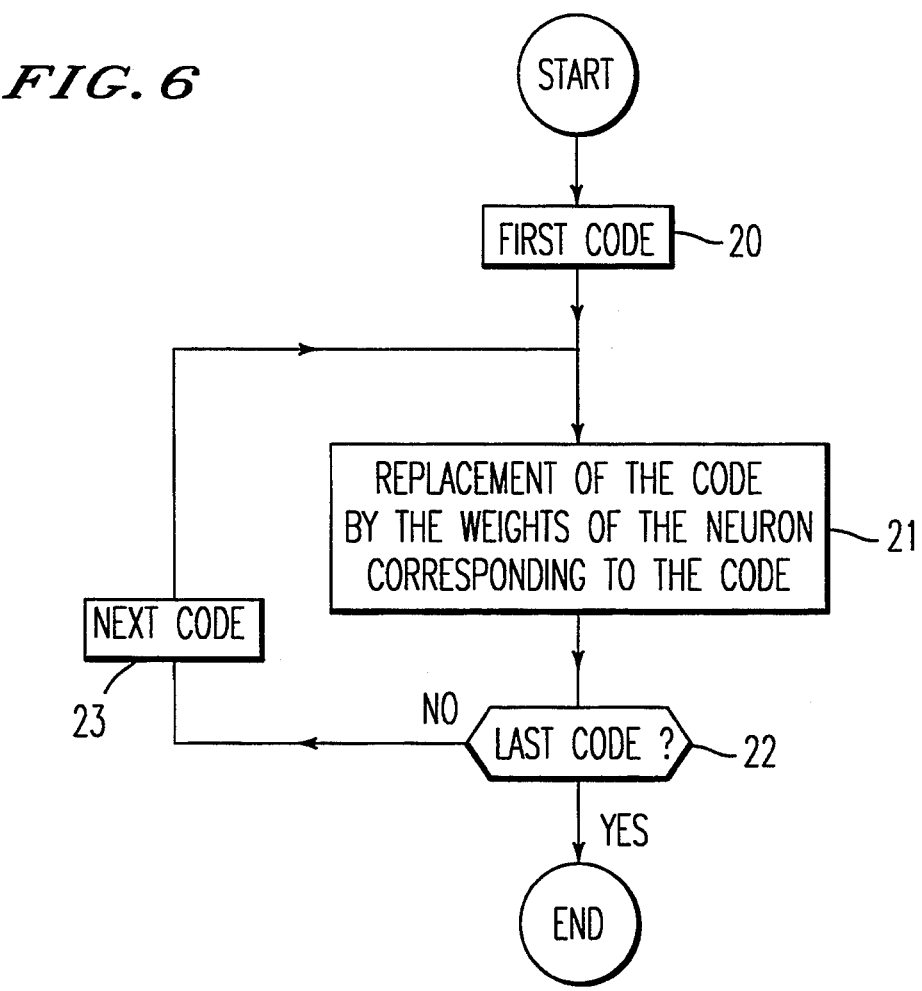

METHOD OF PICTURE COMPRESSION BY AUTO-ORGANISATION OF A NEURAL NETWORK

The present invention relates to a method of block-compression of digital pictures by autoorganisation of a neural network.

The technique of picture compression consists in reducing the quantity of data required to represent a picture. This technique is widely used in the fields of the transmission or storage of pictures.

When a compressed picture is decoded in order to reconstruct its original form, the reconstructed picture is affected by distortion. Consequently, the efficiency of a compression algorithm is measured simultaneously by its rate of compression, the resulting distortion and its complexity of implementation. The complexity of implementation is a particularly important point in the hardware construction of coders and decoders.

The main known methods of block-compression of digital pictures use algorithms such as the Karhunen-Loève transformation, the Hadamard transformation, the cosine transformation and vector quantification. These algorithms are implemented on sequential machines for which the data processing is slow and manual manipulations are required when having to adapt to a different picture type.

In artificial intelligence, neural-connective or neuro-imitative networks are presently experiencing a revival of interest, and the architecture of neural networks possesses intrinsically a massive parallel processing potential.

Parallel data processing permits a considerable time saving as against sequential machines, but the algorithms used hitherto for picture compression are adapted to sequential machines and parallelisation of them is not easy.

The invention relates to a new method of picture compression which is completely automatic whatever the picture type to be compressed, is simple to employ, and uses an algorithm which is directly compatible with the future massively parallel connective machines which will be developed in the coming years. This method is based on the learning concept, which enables it to best adapt to a particular picture type, such as television pictures, aerial pictures, etc., and hence to provide low distortion for this picture type. Moreover, the system can be rapidly reconfigured in order to adapt to another picture type simply by recommencing learning on pictures of this type.

According to the invention, the method of picture compression by auto-organisation of a neural network is characterised in that it comprises:

a preprocessing during which pictures of identical type are partitioned into pixel blocks with dimensions smaller than those of the pictures, a phase of initialising a neural network comprising N neurons disposed in a single plane and having a number of inputs equal to the dimension of the blocks extracted from the pictures, during which values of coefficients, or weights, are randomly allocated to each connection linking a neuron j to an input ei, and an initial neighbourhood radius Vo determining the neighbour neurons of the neuron j is chosen a learning phase during which the neural network is fed successively with pixel blocks extracted randomly from the various pictures and the weights of the neural connections evolve by successive approximations following an algorithm simulating the behaviour of the visual cortex, through a computation of potentials which aims to elect one neuron with updating of its neighbours, until their values are as close as possible to most probable input values, a compression phase during which the source picture is partitioned into pixel blocks, each block being presented one after the other to the inputs of the neural network and coded as a function of the neuron of which the values of the weights are closest to the inputs.

Figure 2:
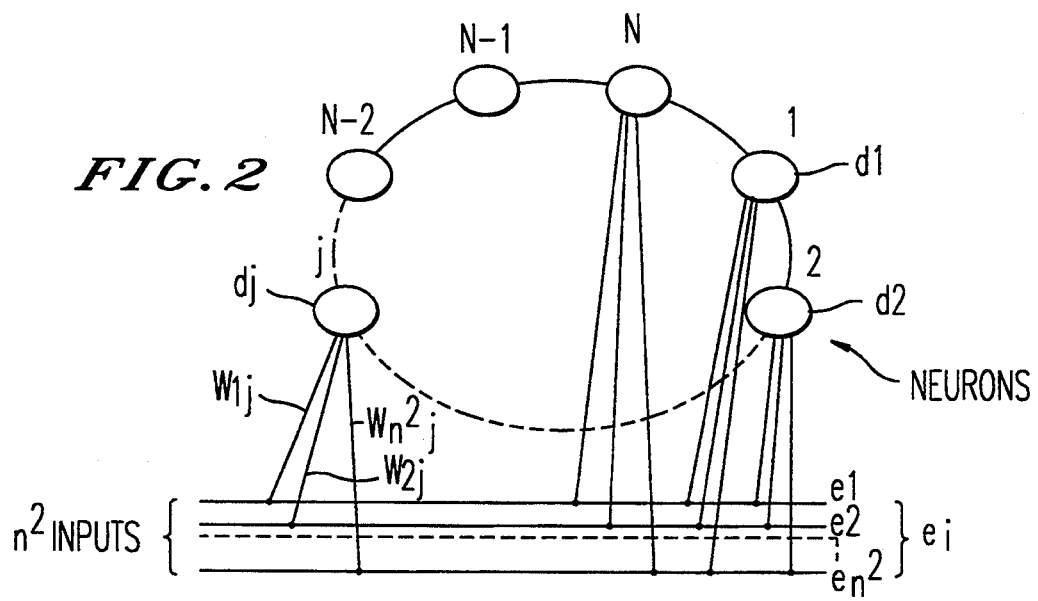
Figure 4:
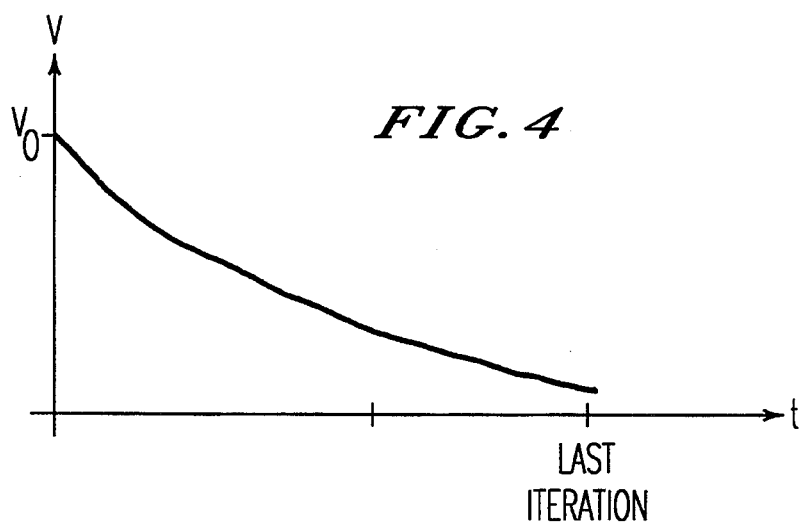
Figure 3:
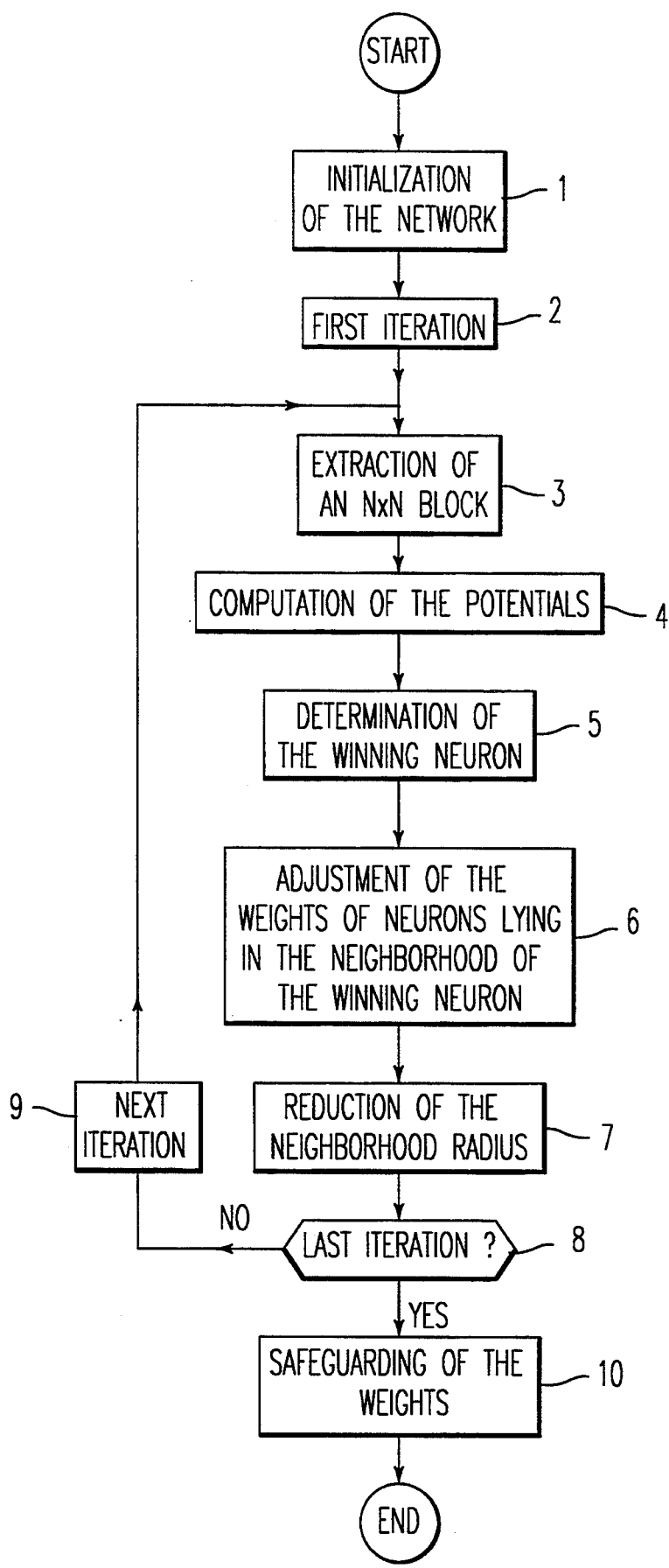
Figure 5:
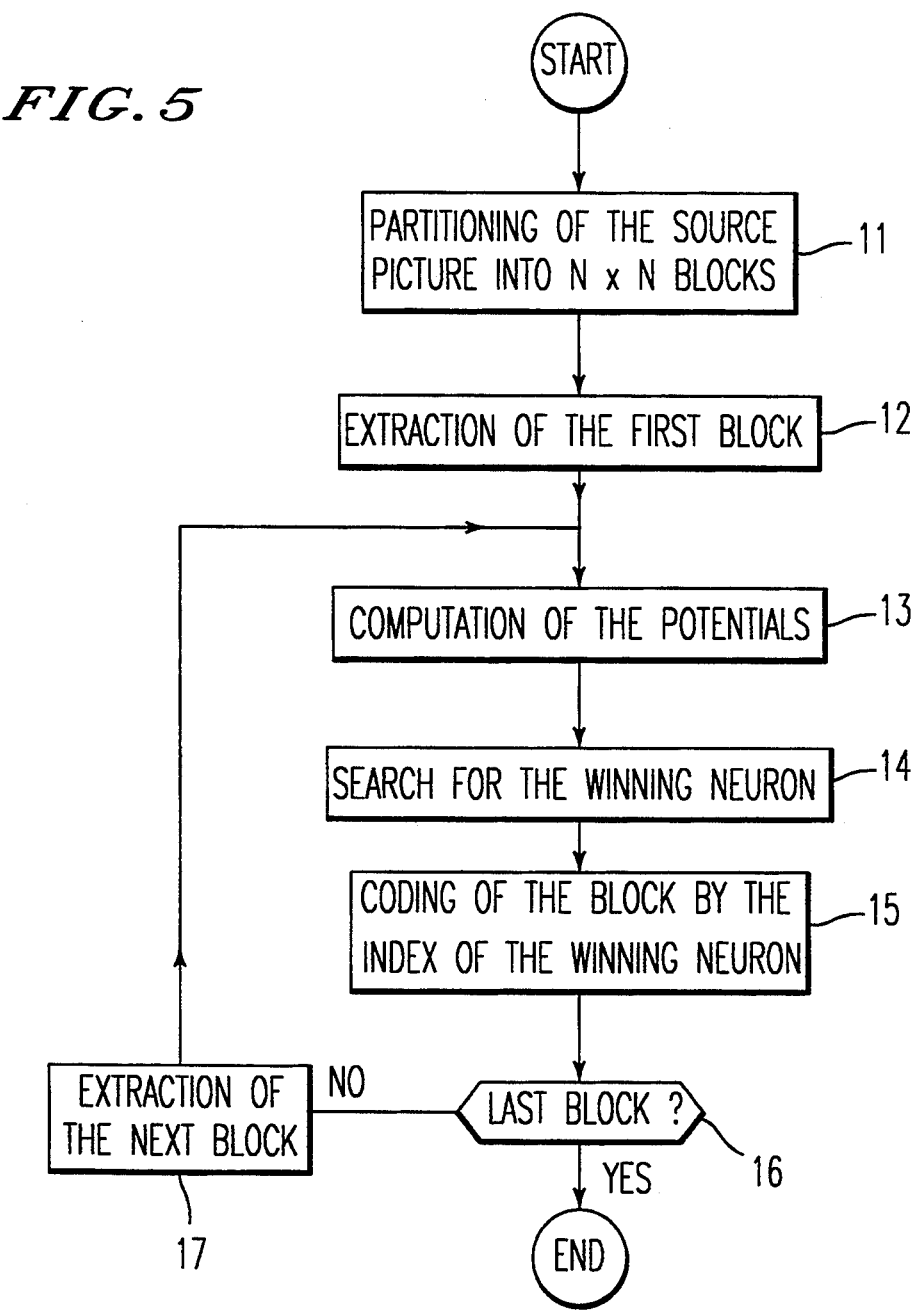

Other features and advantages of the invention will emerge clearly from the following description given by way of non-limiting example and made with reference to the attached figures which show:

FIG. 1, the general structure of Kohonen neural networks;

FIG. 2, an example of a neural network according to the invention;

FIG. 3, a flow diagram of the learning phase, according to the invention;

FIG. 4, an example of the variation in the extent of the neighbourhood during learning, according to the invention;

FIG. 5, a flow diagram of the phase of compression of a source picture, according to the invention;

FIG. 6, a flow diagram of the decoding of a compressed picture, according to the invention.

FIG. 1 shows the general structure of so-called Kohonen neural networks. This type of network comprises just one layer of N neurons disposed in a single plane. Each neuron is connected to all the inputs $e_1 \ldots e_l$ which are intended to receive data such as for example pixels extracted from a picture.

Between the neurons of this layer there are internal connections, of exciting type if the neurons are close neighbours or of inhibiting type if they are distant. The concept of neighbourhood depends on the distance between the neurons.

These neural networks with lateral connections partially simulate the structure of the V17 and V18 areas of the visual cortex. They auto-organise naturally as a function of the inputs received in order to react to a group of data which have similar characteristics; a neuron and its neighbours represent one class of inputs. After a learning phase which consists of a search for similarities, these networks carry out a data compression the nature of which is formally allied to vector quantification, that is to say that a characteristic vector corresponds to a data group.

In a grey-level image partitioned into blocks of for example n×n pixels, certain configurations are much more probable than others. In a learning phase, the use of a neural network with lateral connections permits these most probable configurations to be discovered.

To this end, the neural network shown in FIG. 2 comprises N neurons numbered from 1 to N and whose inputs are n×n blocks (for example n=4 or 8) extracted from a picture of very large dimension compared with n. The number of inputs required for each neuron is equal to the dimension of the pixel block extracted from the picture. In the case of n×x (sic) pixel blocks, each neuron comprises at least $n^2$ inputs and one output. The network is looped preferably in a ring in order to avoid edge effects, that is to say that the neurons are disposed over a closed loop so that all the neurons are surrounded by the same number of neighbour neurons. All the neurons j receive the same inputs which are, at a given instant, the $n^2$ pixels of the $n \times n$ block which are extracted from the picture, and output their response $d_j$ to these inputs.

In a learning phase, the neural network is fed with blocks randomly extracted, from one or more pictures of identical type (for example aerial pictures). A coefficient, termed the weight of the connection wij and which is adjusted by successive approximations until the most frequent configurations are labelled by the weights of the neural connections, is allocated to each neural connection linking an input $e_i$ to a neuron with index j. Besides the connections between a neuron j and all the inputs $e_i$, the definition of a neighbourhood radius for the neuron j enables other neurons of the network belonging to this neighbourhood to learn at the same time. This neighbourhood radius is chosen to be large at the start of the iterations so that many neurons may learn at the same time, and diminishes during learning down to a minimum corresponding to a single neighbour at the end of learning, so as to facilitate the distinguishing of the neurons when the number of iterations increases.

For example, for a network with N=512 neurons, an initial neighbourhood Vo=128 and a final neighbourhood VT=0.5 are well adapted values.

For this learning phase, the auto-organisation algorithm used is the Kohonen algorithm, the flow diagram of which is shown in FIG. 3. This algorithm is chosen for its complete compatibility with future connective machines for which data processing is performed in parallel and comprises the following steps:

In a first step the initialising of the network is performed, 1; the weights $W_{ij}$ of the neural connections between a neuron j and the outputs $e_i$ are initialised for each of the neurons and the extent of an initial neighbourhood radius Vo is chosen. The initial values of the weights of the neural connections are randomly fixed in accordance with a law of uniform probability over the possible grey levels, these levels being situated generally between 0 and 255, that is to say that the values of the weights $W_{ij}$ lie between 0 and 255. The initial value of the extent of the neighbourhood $V_o$ is defined by the user.

In a second step, at the first iteration, 2, there is effected the extraction of an $n \times n$ block, 3, from a picture and the computation of the potentials, 4, of each of the neurons, this computation being performed in parallel. An $n \times n$ pixel block is extracted randomly from the picture, the $n^2$ pixels of the block are presented to the inputs of the neural network, and the potentials $d_j$ of all the neurons j of the network are computed through the following formula:

$$d_j = \sum_{i=1}^{n^2} (W_{ij} - e_i)^2 \text{ for all the neurons } j$$

where $W_{ij}$ is the weight of the connection linking the input i to the neuron j; $e_i$ is the grey level of the $i^{th}$ pixel of the block extracted from the picture. It should be noted that $d_j$ is a positive function which measures the disparity between the state of the neuron j and the state of the inputs $e_i$; $d_j$ is a distance between the vector of weights $\vec{w_{ij}}$ and the vector of inputs $\vec{e_i}$.

In a third step, the "winning" neuron is determined, 5, and the weights of the neurons lying in the neighbourhood of the winning neuron are adjusted, 6. The neuron $j_o$ which best approximates the inputs is sought. It is such that its potential $d_j$ is minimal. The weights of the connections linking, on the one hand, the inputs $e_i$ to the neuron $j_o$, termed "winning neuron" and linking, on the other hand, the inputs $e_i$ to the neighbour neurons of the winning neuron are modified in accordance with the following formula, where t is the rank of the iteration, $\eta$ is the learning constant, V is the extent of the neighbourhood for the iteration rank t.

$$w_{ij}(t+1) = w_{ij}(t) + \eta(e_i(t) - w_{ij}(t))$$

for all the neurons j such that $|(j-j_o) \bmod N| \leq V$, so that the neuron $j_o$ and all the neurons belonging to the neighbourhood of the neuron $j_o$ have their weights which approximate the values of the inputs.

For the neurons j situated outside the neighbourhood V, the weights of the connections linking the inputs $e_i$ to the neurons j are unchanged: $W_{ij}(t+1) = W_{ij}(t)$ for the neurons j such that $|(j-jo) \bmod N| > V$.

The speed of learning depends on the value of the learning constant $\eta$. The value of $\eta$ must lie between 0 and 1. For example, $\eta$ is chosen equal to 0.1 so that the variations in the weights at each iteration are (sic) not too large and so that the learning time is not too long.

Next, the neighbourhood radius is reduced, 7, and a test 8 is performed to find out if all the iterations have been performed; if the test 8 is negative there is a transfer to the next iteration, 9, repeating all the steps 3 to 7, of the flow diagram with a new $n \times n$ pixel block extracted randomly from a picture. The extent of the neighbourhood V is reduced during learning so as to facilitate the distinguishing of the neurons when they approximate the most probable input configurations. FIG. 4 shows an example of the variation in the extent of the neighbourhood during learning. In the example of FIG. 4, a decreasing exponential law has been chosen which can be written $V = V_o \exp(-t/K)$, but any other decreasing law could be suitable. where $V_o$ is the initial neighbourhood, t is the rank of the iteration and K is a positive constant.

The value of K is chosen so that, at the end of learning, that is to say at the last iteration, the value of the neighbourhood V is minimal.

A large number of iterations are necessary for the network to auto-organise: for example, for a network of 512 neurons and a picture of $512 \times 512$ pixels, 32000 blocks of $8 \times 8$ pixels, or 32000 iterations, permit good convergence of the Kohonen algorithm, with the following parameters:

$\eta = 0.1$ for the rate of learning
Vo=128 for the initial neighbourhood
VT=0.5 for the final neighbourhood.

When the auto-organisation process has stabilised, that is to say the test 8, FIG. 3, indicates that the last iteration has been reached, the weights of the neural connections are frozen, through the safeguarding 10 of these weights and the neural network can be used for purposes of compression.

FIG. 5 shows the flow diagram corresponding to the compression of a source picture. For the compression phase, the picture to be compressed is partitioned into $n \times n$ blocks, step 11, and the first block is extracted, 12, from the picture. For each block, the $n^2$ pixels of the block are presented to the inputs of the neural network. The potentials of the neurons are computed, step 13, and the neuron $j_o$ whose potential $d_{jo}$ is minimal is sought, step 14. The $n \times n$ block corresponding to this neuron, termed the "winning neuron", is then coded by the index of this neuron, through a coding step 15, each neuron being numbered from 1 to N, N=512 for example. A test 16 is performed to find out whether this block is the last block of the picture, if not the next block is extracted, 17, from the picture. The $n^2$ pixels of the next block are then, in their turn, presented to the inputs of the neural network and a new neuron is declared the "winner", this block then being coded by the index of this neuron; and so on until all the blocks of the source picture are coded. When all the n×n blocks constituting the picture are coded, the picture is transmitted.

If $b_p$ is the number of bits per pixel in the picture and N is the number of neurons, the rate of compression $T_c$ obtained is as follows:

Tc=bp (source picture)/bp (coded picture)
Tc=bp×$n^2$/log$_2$N.

This rate of compression can be improved by using a variable-length coding, such as for example a Huffman coding, for the indices of the neurons. A variable-length coding permits the indices of the neurons recurring more frequently to be coded in a shorter length.

FIG. 6 shows the flow diagram corresponding to the decoding of the compressed picture. On receiving the picture, in order to decode the compressed picture, it suffices to undertake the operations inverse to coding, that is to say, to replace the indices of the coded picture by the weights of the connections of the neurons corresponding to these indices. Each code is considered separately, beginning with the first, 20, there is effected the replacing of this code by the weights of the corresponding neuron, 21, a test, 22, determines whether this is the last code, if not the next code, 23, is presented, and so on until the last code. The image is reconstructed when all the codes have been deciphered.

The present invention is not limited to the embodiments specifically described; in particular, it is not essential for the neural network to be looped in a ring, a network of neurons disposed in a line can be used on condition that edge effects are taken into account. Similarly, it is not essential for the decrease in the extent of the neighbourhood during learning to follow an exponential law; any law enabling the extent of the neighbourhood to be decreased during learning, for example a linear law having $V_o$ as initial neighbourhood and a minimal final neighbourhood, may be equally suitable.

Neither is it essential for the dimension of the blocks extracted from the picture to be n×n, the blocks can have a dimension n×k, n differing from k.

In the example described, the source picture is in terms of grey level, for a colour picture the method is just as suitable but has three times-as many pixel values since the chrominance values must be appended.

In the example described, in order to code the picture the N neurons were numbered from 1 to N; any other coding permitting the winning neurons to be labelled is suitable.

We claim:

1. Method of picture compression by autoorganisation of a neural network, characterised in that it comprises:
    a preprocessing during which pictures of identical type are partitioned into pixel blocks with dimensions smaller than those of the pictures,
    a phase of initialising a neural network comprising N neurons disposed in a single plane and having a number of inputs equal to the dimension of the blocks extracted from the pictures, during which values of coefficients, or weights, are randomly allocated to each connection linking a neuron j to an input ei, and an initial neighbourhood radius Vo determining the neighbour neurons of the neuron j is chosen
    a learning phase during which the neural network is fed successively with pixel blocks extracted randomly from the various pictures and the weights of the neural connections evolve by successive approximations following an algorithm simulating the behaviour of the visual cortex, through a computation of potentials which aims to elect one neuron with updating of its neighbours, until their values are as close as possible to most probable input values,
    a compression phase during which the source picture is partitioned into pixel blocks, each block being presented one after the other to the inputs of the neural network and coded as a function of the neuron of which the values of the weights are closest to the inputs.

2. Method according to claim 1, characterised in that with each block presented to the inputs of the neural network, the weights of the neuron whose state is closest to the state of the inputs and the weights of all the neighbour neurons are modified so that their values approximate the values of the inputs, the weights of the other neurons being unchanged.

3. Method according to claim 2, characterised in that the neighbourhood radius between a neuron j and the other neurons of the network diminishes during the learning phase.

4. Method according to claim 3, characterised in that the algorithm is the Kohonen algorithm.

5. Method according to any one of the preceding claims, characterised in that the neural network is looped in a ring, so that all the neurons have the same number of neighbour neurons.

* * * * *